Sept. 13, 1966     M. H. SMITH     3,272,960

WELDING APPARATUS AND METHOD

Filed March 4, 1965

INVENTOR.
MELVIN H. SMITH
BY 3,272,960
WELDING APPARATUS AND METHOD
Melvin H. Smith, Perris, Calif., assignor to Bourns, Inc., a corporation of California
Filed Mar. 4, 1965, Ser. No. 437,213
9 Claims. (Cl. 219—91)

The invention hereinafter disclosed pertains to improvements in welding apparatus and techniques useful in accomplishing electrical connection of very fine gauge insulated electrical conductors to much heavier-gauge bare conductors such as terminals or the like.

In providing terminations of electrical components such as circuits, coils, and the like which comprise insulated electrical conductors, it is customary to strip or otherwise remove a portion of the insulation adjacent an end of the conductor and to then fusion-unite the end of the conductor to a terminal device as by soldering or spot-welding. When the insulated conductor is of medium-gauge or heavier, mechanical stripping of the insulation as performed manually with the aid of cutting instrumentalities has been satisfactory; and semi-automatic devices have been developed for the purpose. As miniaturization of electronic devices has progressed with incident employment of insulated conductors of smaller and smaller gauges, the matter of satisfactorily and economically removing insulation and effecting satisfactory terminations has become of increasing significance and difficulty. For example when the wire of a conductor is of gauge finer than 36, and the insulation is tenaciously adherent, or is tough and slippery as is polyhaloethylene, satisfactory mechanical stripping is difficult and time-consuming. Chemical removal of insulation has been resorted to in some cases, where the nature of the insulation permitted, but special techniques and apparatus are therein required; and in the case of insulation characterized by extreme chemical inertness the results have been less than satisfactory irrespective of the mode of insulation-removal utilized.

The present invention provides a new mode, and novel apparatus, for accomplishing the fushion-union and effective electrical connection of insulated electrical conductors to other electrical conductors such as strips, terminals, and other base conductors, without requiring pre-stripping of the insulation and without any necessity for cutting instrumentalities or chemicals and without the expenditure of time previously required for removal of insulation from the wire or conductor. Briefly, according to the invention the insulated wire and the base conductor to be electrically united or joined are first brought into close juxtaposition between suitable welding electrodes such as the opposed movable (spring-loaded) electrodes of a spot-welding device, and with the insulation on the conductor separating the wire thereof from the base conductor. Thus the first operation or step according to the invention may be substantially exactly the same as has heretofore been the second step, that is, what has heretofore been the step next following stripping of insulation from the wire. Secondly, according to the invention, and with the welding electrodes pressing the insulated wire against the base conductor with an adjusted force, high-voltage (e.g., 500–1500 volts) high-frequency (e.g., 10–50 kc.) power is supplied to the welding electrodes with continuing force applied tending to bring one electrode toward the other. The high-frequency, high-voltage pulse is such as to cause ionization and breakdown or degradation of the insulation along a path between the electrodes. Thirdly, according to the invention, either concurrently with continued application of the high-voltage high-frequency power or at least prior to deionization of the path between the electrodes, a pulse of low-frequency or direct-current (low-potential power (hereinafter termed a "power pulse") is applied to the electrodes while concurrently continued movement of one or both of the electrodes toward closure is permitted as force is continued or maintained on the electrode supports. The effect of the low-frequency or D.C. power pulse is to further heat and soften or disintegrate the insulation and greatly decrease the physical resistance of the latter to being squeezed or forced from between the electrode and wire and from between the wire and the base conductor under the influence of the pressure applied by the electrodes incident to continuance of the applied force. Thus the force applied to the electrodes causes closing movement of the electrodes with concurrent outward flow or movement of insulation until the wire of the insulated conductor is brought into metallic contact with the base conductor and with the adjacent electrode. As the latter stage of the operation is reached, some fusion together of portions of the wire of the conductor and base conductor occurs. More extensive fusion and connection is effected by melting incident to generation of additional localized heat, either by continuance of the power pulse or, preferably, by application of a separate second power pulse. Application of a somewhat delayed second power pulse of greater energy content to effect the final stage of fusion-uniting of a portion of the insulated conductor wire with a portion of the base conductor is especially advantageous in certain instances, depending upon relative sizes of the wire and base conductor, the character and thickness of the insulation, and other factors, as will be evident to those skilled in the art.

Apparatus for effecting the described process of fusion-uniting or welding of an insulated wire or conductor to a base conductor without prior stripping or removing of insulation, as hereinafter described with reference to a preferred exemplary embodiment of apparatus in accord with the invention, comprises conventional spring-loaded welding electrodes and conventional mechanical means for moving the electrodes apart and permitting one or both of the electrodes to move toward the other in a closing movement, and special novel power and circuit means arranged to efficiently supply the high-frequency high-voltage ionizing power and the low-frequency or D.C. power pulse or pulses to the electrodes. The energy and current for the latter pulse or pulses are preferably derived from a conventional or commercially-available D.C. spot-welding power supply unit, such as one marketed as "Weldmatic Model 1016C" by Weltek Division of Wells Electronic Company, Westminster, California, under external control of suitable timer or control means; although any other suitably controlled source of direct-current or very low-frequency power at suitable voltage could be used. High-frequency high-voltage power is supplied to the electrodes from means including a wave generator or oscillator. Since both high-frequency high-voltage power and low-voltage D.C. or low-frequency power are supplied to the same electrodes, novel means are used to concurrently feed both types of power to the electrodes without adverse effect upon either of the power supplying means by the other. Primary energy for all of the units of the apparatus is taken from A.C. mains or any other suitable source of electric A.C. power.

The preceding brief general description of the invention makes it evident that it is a principal object of the invention to provide improvements in methods of effecting a welded electrical connection of an insulated wire to a base conductor.

Another principal object of the invention is to provide improvements in means for making a welded electrical connection of an insulated wire to a base conductor.

Another object of the invention is to provide a method and means for providing or effecting a welded electrical connection of an insulated wire to another conductor without necessity for first removing insulation from the wire.

Another object of the invention is to provide means whereby insulated wire can be fusion-united and electrically connected to another conductor without necessity for stripping insulation from the wire.

A very broad object of the invention is to provide improvements in the art of connecting an insulated wire to a base conductor.

Other objects and advantages of the invention are hereinafter set out or made evident in the appended claims and the following detailed description of a preferred exemplary embodiment of apparatus and method according to the invention, the description having reference to the appended drawings in which is depicted the exemplary apparatus and in which drawings:

Figure 1:
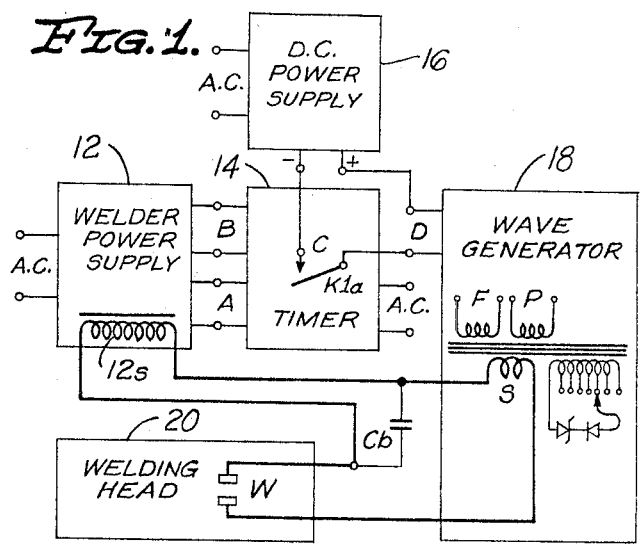
FIGURE 1 is a schematic block diagram showing the organization of major units of the apparatus.
Figure 4:
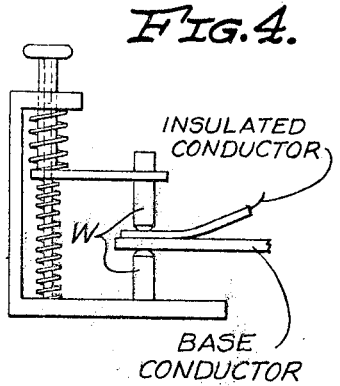
FIGURE 4 is a schematic view depicting an arrangement of spring-loaded electrode means and a disposition of an insulated wire and base conductor between the electrodes.

Referring first to FIGURE 1, the preferred and exemplary system of major units by means of which the previously described novel process or method is performed includes a conventional spot-welding power-supply unit 12, a timing or control unit 14, a D.C. power-supply unit 16, an oscillator or wave generator unit 18, and a conventional spot-welding head unit 20. Each of units 12, 14 and 16 is supplied alternating-current (A.C.) power from a suitable source such as conventional A.C. mains, by way of input lines labeled A.C. in FIGURE 1. The input lines may be connected by way of a master switch (not shown) to a main A.C. power line.

Power derived from an A.C. line is rectified or converted to D.C. or very low frequency low-potential power by unit 12 and by that unit is fed from an output device such as a transformer secondary 12s, in pulses to welding head electrodes, W, of unit 20. The low-voltage power pulses are generated under the control of timing unit 14. The timing unit is supplied A.C. power from the mains, which power, preferably following rectification to D.C., is therein used under the control of a manually-operated switch to initiate a sequence of operations of the oscillator or wave generator of unit 18 and the welding power supply unit 12. Additionally, power supplied from the A.C. mains is rectified by D.C. power-supply unit 16 and is fed to the high-frequency oscillator or wave generator unit 18 via switch or relay means comprised in control or timing unit 14. The high-frequency high-potential output-power of the wave generator unit 18 is supplied to the welding electrodes by way of conductors and coupling means connected to a secondary coil S in which the high-voltage is generated and which coil is comprised in unit 18. The coil S consists of but a few turns of heavy wire through which the D.C. pulses from unit 12 are passed without significant impedance. Thus secondary coil S serves both as the secondary or output side of a transformer excited by the oscillator of unit 18 and as a path for D.C. pulse power from unit 12. The high-frequency high-voltage power generated in the transformer secondary coil S is effectively passed to the welding head electrodes W via a bypass capacitor $C_b$ which is connected in shunt across the output device (coil 12s) of unit 12, whereby high-frequency power loss to unit 12 is made to be negligible. As is evident, the transformer comprising secondary coil S provides a high-impedance block against flow of D.C. pulse power into the oscillator, and capacitor $C_b$ serves to obviate appreciable dissipation of high-frequency power in unit 12.

Figure 3:
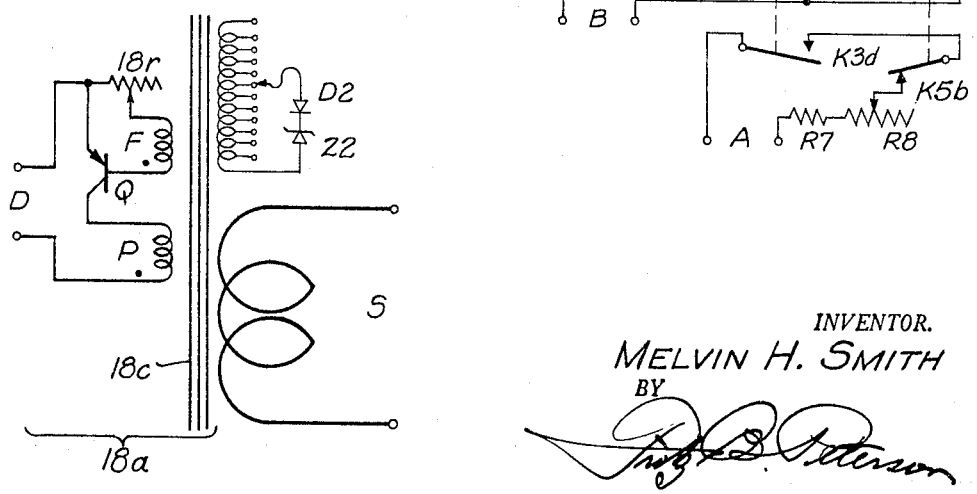
FIGURE 3 is a schematic circuit diagram of a high-frequency wave generator or oscillator unit and the output connections therefor depicted in diagrammatic form in FIGURE 1.

Referring to FIGURES 1 and 3, when the timer unit 14 permits flow of D.C. power from unit 16 and unit 18 via relay contacts $k1$ and terminals D, the oscillator 18a commences oscillating, with transistor Q alternately conducting and becoming blocked. The unidirectional current pulses passed by the transistor pass through primary coil P and thus create in the core 18c a rising and falling time-pattern of flux. The increasing flux generates a biasing potential in feedback coil F which potential is of polarity tending to increase current flow through the transistor Q, whereby the latter rapidly reaches a state of saturation. As saturation is reached the rate of change of flux in the core suddenly drops to zero value, causing the biasing potential to drop to zero value, and the transistor Q falls into substantially nonconductive status. As the transistor emitter-collector current drops to zero the flux tends to fall to zero value and in so dropping induces a high-voltage wave of spike waveform in secondary coil S. Also, a back-biasing potential is generated in the feedback coil F, which biases the transistor to complete cutoff. The high voltage-wave is applied to the electrodes W, as previously indicated. As soon as the flux or field in core 18c has completely collapsed, the transistor Q again commences to conduct, and the described cycle of oscillator action is repetitively repeated.

Referring to FIGURE 3, a means is provided for adjustably limiting the high-frequency potential generated in secondary coil S of the wave generator transformer. For the noted purpose a tapped-secondary coil R is inductively linked with the core 18c, as by being wound thereon; and a back-to-back rectifier combination comprising a diode D2 and a Zener diode Z2 is connected to one end of the coil R and to the movable contact as indicated. Thus as the transistor current and flux in core 18c increase more or less linearly, potential is induced in coil R but current cannot flow because diode D2 is poled to block current flow. Hence no energy is absorbed in coil R during increase of the flux density in core 18c. However, during collapse of the flux field, the potential generated in coil R is of polarity to forward bias diode D2, whereby D2 may conduct; but conduction is blocked by Zener diode Z2 until breakdown potential is reached, at which point current will flow as in a short-circuited secondary coil, and the rate of change of flux in the core will be opposed and thus the magnitude of the potential induced in secondary coil S will be limited accordingly. As is now evident, the point or time of the voltage rise in secondary coil S at which the Zener diode breaks down may be selected by appropriate adjustment of the movable contact on coil R. Thus both the maximum potential and the energy content of the several cycles of the high-potential high-frequency wave applied to the welding electrodes may be adjusted as required or desired, to accommodate welding of insulated conductors of various sizes and various insulation characteristics.

Continuing with reference to FIGURE 3, means are provided in the wave generator circuitry for adjusting the frequency of the wave output, and, hence, the power content of the wave. For that purpose the connection of feedback coil F to the emitter of transistor Q is through an adjustable resistance 18r. Adjustment of the effective value of 18r varies the magnitude of the the pulses of current through the transistor and thereby the power content of the output wave (and to some extent the amplitude of the output wave as well) is adjusted.

For superior performance, the core 18c of the wave generator is constructed of ferrite material, of toroidal or rectangular form, and otherwise having characteristics as hereinafter noted.

As is evident from the preceding description, the wave generator is made to operate when the timing unit 14 supplies D.C. power to terminals D; and the wave generator continues to produce an output wave in coil S until the supply of D.C. power is terminated, or until the oscillator is blocked by reaction caused by heavy current flow through coil S incident to establishment of good metallic contact of the wire with the base conductor.

Figure 2:
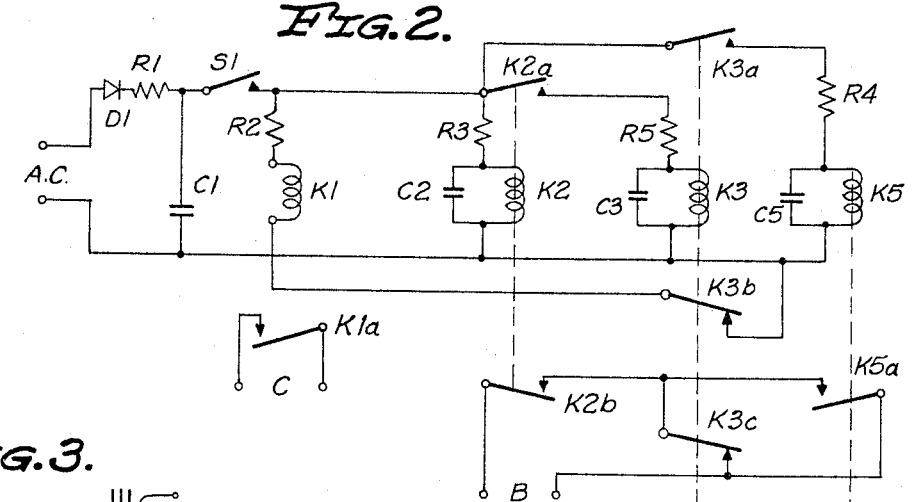
FIGURE 2 is a schematic circuit diagram showing details of the timing unit or control device of the apparatus shown diagrammatically in FIGURE 1.

Referring now to FIGURE 2, an exemplary and preferred form of timing unit, 16, is shown; although it may be pointed out that other sequential switching means may be used if the requirements of the unit are anticipated. Alternating current power is applied to the terminals A.C. of the unit, preferably from the same line and via the same master switch used to supply and control power supplied to units 12 and 16. The A.C. power is rectified by rectifier D1 and smoothed by a filter comprising resistor R1 and capacitor C1 when a welding-cycle initiating switch S1 is closed by an operator. Closure of switch S1 initiates the cycle of automatic preliminary and welding operations previously explained, and subsequent opening of the switch returns the circuitry to condition for initiation of another similar cycle. Upon manual closure of switch S1, current flows through resistor R1 and the magnet coil of a relay K1, via normally closed contacts K3b of a relay K3. Upon energization, relay K1 pulls up and closes normally open contacts K1a which action permits unit 16 to supply D.C. power to the wave generator as is made evident in FIGURE 1. Thus high frequency A.C. is supplied to the welding electrodes W as previously indicated. Concurrently, current flows through the coil of a relay K2 via resistor R3. The latter relay does not instantly pull up, however, due to the presence of resistor R3 and of capacitor C2 shunting the coil. After a time dependent upon the time constant of the combination of the relay coil K2, resistor R3, and capacitor C2, the relay K2 pulls up and closes contacts K2a and K2b. Closure of contacts K2a initiates energization of relay K3, which has delayed pull up due to connection of time-constant or time-delay means R5–C3–K3 in the circuit. Closure of contacts K2b closes a welder control circuit, via normally closed contacts K3c of a relay K3, across terminals B, whereby the welder power supply unit 12 supplies a pulse of D.C. power to the welding electrodes W, via the coil S of the wave generator unit 18. The duration and power content of the D.C. pulse thus supplied is regulated by manually-set control devices forming a part of the commercially-available unit 12. It should be noted that the welding current supplied by unit 12 to the electrodes W does not flow through relay contacts K2b. Rather, closure of the latter contacts initiates energization of a power relay comprised in unit 12. The power relay acts to close a circuit connecting a charged power capacitor to the primary of a transformer whose output device or secondary 12s is connected to the welding electrodes. (See FIGURE 1). The power content of the D.C. pulse is regulated by regulating the charging potential applied to the power-storing capacitor in unit 12, as is known in the art.

At a determinable time following discharge of the first D.C. power pulse through the welding electrodes, relay K3 pulls up. Pull-up of relay K3 closes normally open contacts K3a and K3d, the former contacts initiating energization of a relay K5, and contacts K3d closing a circuit across terminals A, via normally closed contacts K5b of a relay K5. Pull-up of relay K5 is adjustably delayed by delay means including the relay coil impedance and elements R4–C5, and thus opening of contacts K5b is subsequent to closure of contacts K3d. Closure of the latter contacts connects resistor R7 and adjustable resistor R8 in series across terminals A, and thereby changes the regulation of the charging potential of the power storage capacitor in unit 12. Terminals A are merely in shunt across the one end terminal and the movable contact terminal of the charging-potential regulating potentiometer comprised in unit 12, whereby when relay K3 pulls up and the R7–R8 circuit is placed in shunt across the potential regulating potentiometer, the voltage to which the power-storing capacitor is charged is increased to an extent adjusted by means of variable resistor R8. Thus variation of R8 varies the power content of the second D.C. pulse supplied to the welder electrodes by unit 12, whereby different sizes of wire may be satisfactorily welded.

As relay K3 pulls up, the circuit across terminals B (through relay contacts K2b and K3c) is opened at contacts K3c, whereby the power controlling relay in unit 12 drops out and the power transformer and electrodes W are isolated from the power storing capacitor. Further as a result of pull-up of relay K3, the normally-closed contacts K3b open, whereby relay K1 is de-energized and falls out, contacts K1a open, and the supply of power to the oscillator or wave generator of unit 18 is interrupted.

In the meantime, as soon as contacts K3c of relay K3 open and contacts K3d close, the power-storing capacitor in unit 12 is quickly recharged (under the control of R7–R8 as noted), the charging being complete by the time relay K5 pulls up. As the circuit elements R4–C5–K5 of the time-delay circuit for relay K5 finally permit the pull up of the latter relay, contacts K5b are opened and contacts K5a are closed. Opening of contacts K5b returns full control of the power-capacitor charging rate to the potentiometer in unit 12 in preparation for future operation; and closing of contacts K5a causes energization (via contacts K2b and terminals B) of the electromagnet of the power-controlling relay in unit 12, whereupon the power-storing capacitor is discharged through the transformer primary to produce a power pulse in output device 12s to provide a welding (fusing) current through the now-contacting wire of the insulated conductor and the base conductor. Force applied to the base conductor and the insulated conductor, by way of the electrodes being pressed one toward the other, aids in bringing the wire into effective conductive metallic contact with the base conductor during flow of the first D.C. pulse, and aids in effecting good welding (fusion) contact during flow of the second pulse from unit 12. Following completion of the second power pulse, the circuitry and apparatus are returned to initial condition by returning the welding electrodes to fully open position and by manual opening of switch S1 of the timing unit.

It will be evident to those skilled in the art that components such as the resistors may be of the variable type whereby adjustments may be made, and that the pull-up delay in the case of any of the relays can be selected and adjusted by judicious selection of the values of the circuit components in accordance with known principles of electronic design. Exemplary values of many of the components utilized in the illustrated exemplary physical embodiment according to the invention are set out in Table I following.

Table I

| Element or unit: | Character or value |
|---|---|
| D1 | DI–76 1 amp. diode. |
| D2 | 1N2617 .75 amp. diode. |
| Z2 | 1N3015 Zener diode, 200 v. |
| C1 | 200 μf 150 v. P.C. capacitor. |
| C2 | 100 μf 25 v. P.C. capacitor. |
| C3 | 500 μf 25 v. P.C. capacitor. |
| C5 | 350 μf 25 v. P.C. capacitor. |
| Cb | .047 μf 1200 v. P.C. capacitor. |
| K1, K2, K5 | Bourns, Inc. Model 3101J–001–1251 Relay. |
| K3 | Two Bourns, Inc. Model 3101J–001–1251 Relay, in parallel. |
| R1 | 10 ohms, 5.0 watt. |
| R2 | 10K ohms, 0.5 watt. |
| R3 | 10K ohms, 0.5 watt. |
| R4 | 10K ohms, 0.5 watt. |
| R5 | 5K ohms, 1.0 watt. |
| R7 | 47K ohms, 0.5 watt. |
| R8 | 0.5 megohm, 0.5 watt. |
| Unit 20 | Weldmatic 1032B Weld head, Weltek Div., Wells Electronic Co., 5132 Cornell Ave., Westminster, Calif. |
| Unit 12 | Weldmatic Mod. 1016C, Weltek Div., Wells Electronic Co. |
| Unit 16 | Any simple D.C. power supply 8 v.–5 amps. |
| Q | 2N1100 transistor. |
| S | Two coils in parallel, each 28 turns of .142″ magnet wire. |
| P | Four turns, 22 ga. magnet wire. |
| F | Two turns, 22 ga. magnet wire. |
| R | Nine turns, 22 ga. magnet wire, tapped each turn. |
| Core 18c | Rectangular, open center, one square inch cross-section, solid ferrite core. |

The preceding detailed description makes it evident that the invention anticipates the aforementioned objects. It also is evident that in the light of the disclosure and description of a preferred mode and form of apparatus according to the invention, changes within the true spirit and scope of the invention will occur to others. Accordingly, it is not desired that the invention be limited to exact details as shown and described but that the scope of the invention be restricted only as required by the appended claims.

I claim:

1. A method of electrically welding a fine-gauge insulated conductive wire to a base conductor without separate stripping of insulation from the wire, said method comprising as steps:

bringing the insulated wire and base conductor into longitudinal juxtaposition in a path between a set of welding electrodes with insulation on the wire separating the wire from the base conductor and from one of the electrodes and advancing at least one of the electrodes toward the other with said wire and base therebetween to press the insulation on said wire firmly against said base conductor and against one of said electrodes;

applying across the electrodes a high-voltage high-frequency A.C. potential sufficient to cause ionization of material and degradation of insulation along the said path between the electrodes;

thereafter during continued ionization of material along said path, applying force tending to close said electrodes and concurrently passing a first pulse of direct current between the electrodes along said path, whereby to sufficiently degrade the insulation that the electrodes bring the wire into metallic contact with the base conductor, and thereafter passing a second pulse of current between the electrodes and through the contacting wire and base conductor in said path whereby the melt portions of the wire and conductor and cause fusion-union thereof in said path.

2. Welding apparatus adapted to electrically weld a fine-gauge insulated electrical wire to a base conductor without removal of insulation from the wire, said apparatus comprising:

first means, including high-frequency high-potential electric wave generating means, for providing high-voltage-high-frequency potential across a coil included in said first means and a high-frequency bypass capacitor connected in parallel with said coil;

second means, including a welding head having first and second welding electrodes with space therebetween for such wire and base conductor, and said second means including means for exerting force tending to move the first electrode toward the second electrode;

third means, including a source of low-voltage electrical current pulses, and said third means also including connection means for connecting said source of electrical power pulses to said welding electrodes with said coil in series relation;

fourth means, including electrical timing means, connected to said first means and to said third means, said fourth means operable upon energization thereof to first cause said first means to provide high-voltage high-frequency electric potential across said coil and thereby across said electrodes to cause ionization along a path between the electrodes, and said fourth means thereafter effective to cause said third means to provide a low-voltage electrical current pulse to said electrodes to provide a welding current between said electrodes; and fifth means, including power means for supplying electric power to said first, third and fourth means and for controlling application of power thereto.

3. Welding apparatus especially adapted for welding unstripped fine-gauge insulated wire to a base conductor, said apparatus comprising:

first means, including spaced-apart electrodes arranged to receive therebetween a portion of insulated wire and a portion of a base conductor in juxtaposed relation;

second means, including high-voltage high-frequency electrical means connected to said first means, effective to supply high-voltage high-frequency electric power to said electrodes to ionize material including insulation on a wire interposed in a path between said electrodes;

third means, including power means connected to said first means effective to sequentially supply first and second pulses of low-potential electric power to said electrodes following ionization of insulation by action of said second means, to effect sequential softening of insulation and welding of wire and base conductor; and fourth, means, including means for applying force tending to move one of said electrodes toward the other during the period of time during which said high-frequency electric power is supplied to said electrodes and during at least the period during which the first pulse of low-potential electric power is supplied to said electrodes.

4. Welding apparatus as defined in claim 3, in which said second and third means further include timing means for regulating the supplying of high-frequency power and of low-potential power to said first means, whereby said high-frequency power is supplied first and the first pulse of low-potential electric power is supplied at least in part prior to termination of the supplying of high-frequency electric power.

5. Welding apparatus as defined in claim 3, in which said second means and said apparatus include a secondary coil in which the high-frequency high-voltage power is generated and through which said low-potential electric power is passed to said electrodes.

6. Welding apparatus as defined in claim 5, in which said third means includes an output device in which said low-potential power is generated, and in which apparatus said output device is connected in series with said secondary coil across said electrodes, and in which apparatus a high-frequency bypass capacitor is connected across said output device whereby to provide a low-impedance path for said high-frequency power.

7. An improved welding apparatus comprising:
   first means, including a welder power supply for producing pulses of low-potential current in an output device;
   second means, including a wave generator for producing high-potential high-frequency power in an output coil thereof said coil being characterized by low impedance to said pulses of low-potential current;
   third means, including timing means, connected to said first means and to said second means, effective to control the production and time sequence of first and second current of pulses of low-potential power by said first means and for controlling the production and time of production of high-potential high-frequency power by said second means;
   fourth means, including means for supplying electric power to said first means, to said second means and to said third means;
   fifth means, including first and second electrodes and means for urging said electrodes one toward the other with a space therebetween for material to be used; and
   sixth means, including conductor means, connecting said output coil in series with said output device across said electrodes for delivery of pulses of low-potential current from said first means to said electrodes, said sixth means also including a bypass capacitor connected in shunt with said output device to provide a low-impedance path for high-frequency power from said output coil to said electrodes.

8. An improved welding apparatus according to claim 7, said wave generator comprising a primary coil inductively linked to said output coil, and said coil comprising only a few turns of insulated wire of large cross-section to minimize the impedance thereof to passage of pulses of low-potential current.

9. A spot-welding apparatus especially adapted for welding very fine gauge insulated wire to a base conductor, said apparatus comprising:
   first means, including a pair of welding electrodes;
   second means, including low-potential power means for generating pulses of low-potential current in an output current coil;
   third means, including a high-frequency wave generator means having a high-voltage output coil in which high-frequency high-voltage A.C. potential is generated;
   fourth means, including controlling means connected to said second means and to said third means, for controlling initiation of generation of high-frequency high-voltage A.C. potential in said output coil and for controlling subsequent generation of pulses of low-potential current in said current coil;
   fifth means, including conductor means connecting said output current device, said output coil and said electrodes in a series loop, and said fifth means including a high-frequency bypass capacitor means shunting said output current coil, whereby both high-frequency high-voltage potential and low-potential current may be conducted to said electrodes with very low power loss via the same conductor means; and
   sixth means, including means for supplying input power to said second, third and fourth means.

References Cited by the Examiner
UNITED STATES PATENTS

| 1,613,957 | 1/1927  | Madden    | 219—86    |
| 1,902,469 | 3/1933  | Seede     | 219—91    |
| 2,247,688 | 7/1941  | Kinyon    | 219—117 X |
| 3,119,006 | 1/1964  | Faulconer | 219—85    |
| 3,155,809 | 11/1964 | Griswald  | 219—86    |

RICHARD M. WOOD, *Primary Examiner.*

UNITED STATES PATENT OFFICE
CERTIFICATE OF CORRECTION

Patent No. 3,272,960                                  September 13, 1966

Melvin H. Smith

It is hereby certified that error appears in the above numbered patent requiring correction and that the said Letters Patent should read as corrected below.

Column 2, line 11, for "(low-potential" read -- low-potential --; column 4, line 34, for "repidly" read -- rapidly --; line 57, for "fiux" read -- flux --; column 8, line 9, for "the" read -- to --; column 9, line 31, strike out, "of", first occurrence; same line 31, strike out "power"; line 41, for "used" read -- welded --; column 10, line 28, for "current device" read -- current coil --.

Signed and sealed this 22nd day of August 1967.

(SEAL)
Attest:

ERNEST W. SWIDER                                    EDWARD J. BRENNER
Attesting Officer                                Commissioner of Patents